G. TARAGLIO.
PNEUMATIC SHOCK ABSORBER.
APPLICATION FILED FEB. 3, 1910.

998,997.

Patented July 25, 1911.

2 SHEETS—SHEET 1.

WITNESSES.

INVENTOR,
GIUSEPPE TARAGLIO,
by
Attorney.

G. TARAGLIO.
PNEUMATIC SHOCK ABSORBER.
APPLICATION FILED FEB. 3, 1910.
998,997.
Patented July 25, 1911.
2 SHEETS—SHEET 2.
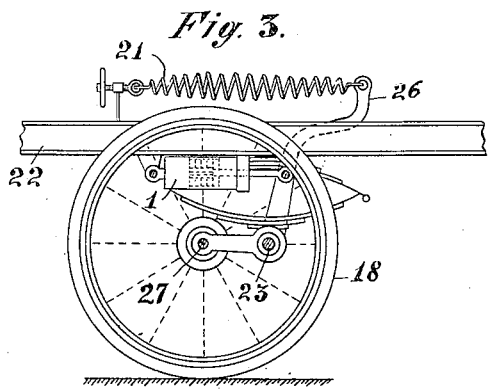
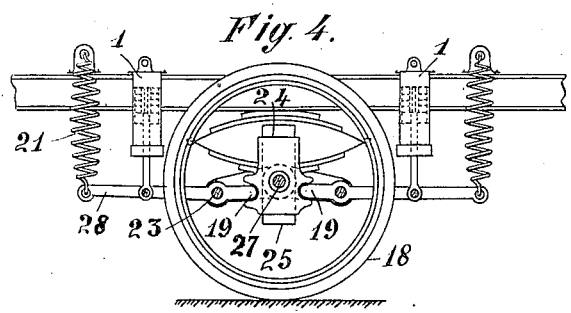
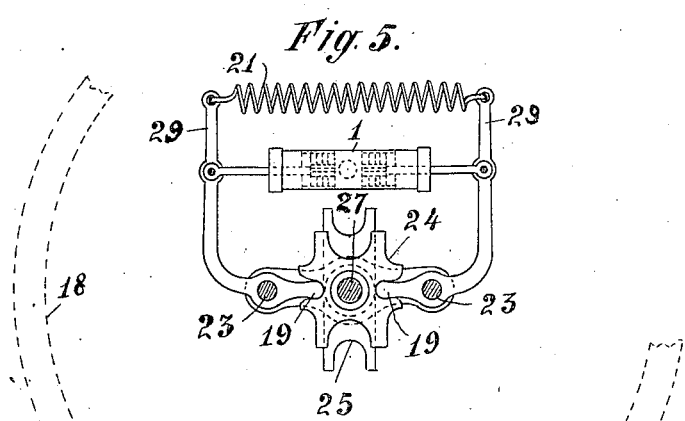
WITNESSES,
INVENTOR
GIUSEPPE TARAGLIO,
Attorney.

UNITED STATES PATENT OFFICE.

GIUSEPPE TARAGLIO, OF ROME, ITALY.

PNEUMATIC SHOCK-ABSORBER.

998,997.

Specification of Letters Patent. Patented July 25, 1911.

Application filed February 3, 1910. Serial No. 541,788.

*To all whom it may concern:*

Be it known that I, GIUSEPPE TARAGLIO, a subject of the King of Italy, residing in the city of Rome, in the Kingdom of Italy, have invented certain new and useful Improvements in Pneumatic Shock-Absorbers, of which the following is a specification.

In order to provide an efficient device for damping the shocks to which the wheels of vehicles are subjected on account of inequalities of the ground it has been often proposed to employ a pneumatic brake, usually consisting of a cylinder and a piston which, either compresses the air within the cylinder or compresses the air at one side of the piston and, at the same time, produces rarefaction of air at the other side of the piston. Nevertheless, none of said systems has practically secured that smoothness, in working, which justifies the employment of the pneumatic shock absorber, as a substitute for the ordinary springs which are recognized as insufficient for the purpose.

The present invention has, for its object, a new form of pneumatic shock absorber by means of which an exceedingly smooth and an absolutely reliable working of the device is assured, the device being arranged to control the resistance which the air opposes to any sudden compression by causing the flow, from one chamber to another through very small passages, and, in the preferred form, this is assured by arranging a succession of chambers in which the pressure is gradually diminished.

In the appended drawings is illustrated the construction of a cylinder according to the present invention and also several manners of fitting same to vehicles of different character.

Figure 1:
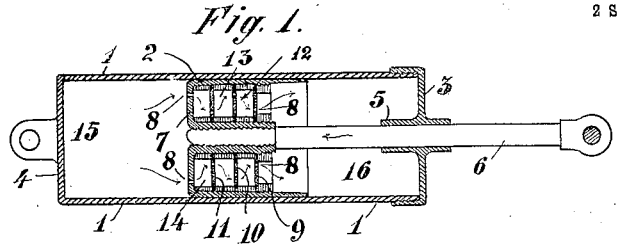
Figure 2:
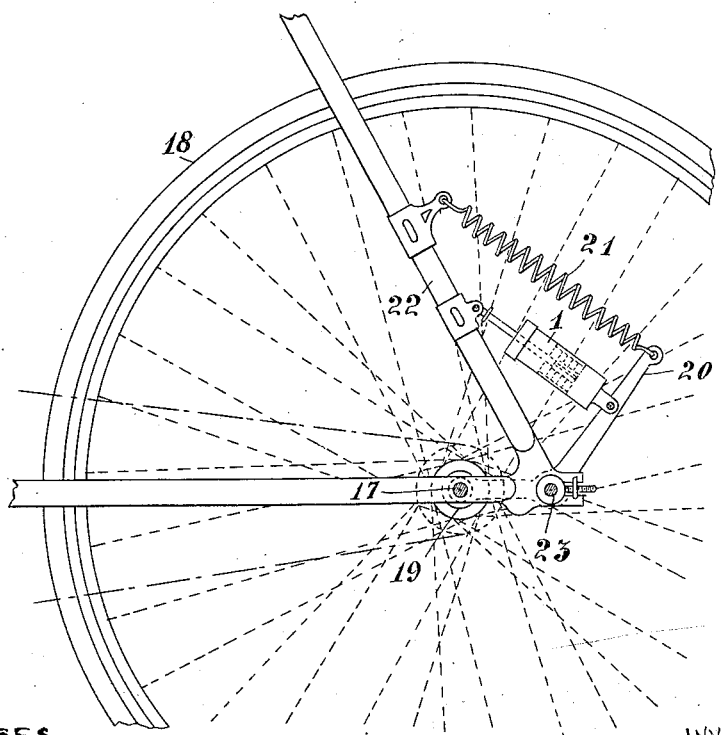

Figure 1 shows a longitudinal section of the cylinder and of the piston of the pneumatic shock absorber. Fig. 2 shows the application of the same to a bicycle. Fig. 3 shows the application to an automobile. Figs. 4 and 5 show two different manners of applying the invention to heavily loaded cars.

The pneumatic shock absorber according to the present invention consists (see Fig. 1) of a metallic cylinder, 1, having a piston, 2, therein and one of said parts being connected, by means of intermediate links, with axle boxes or other supports for the wheels in such a manner that the vertical movements of said wheels, due to inequalities of the ground, cause displacement of the piston in the cylinder.

The cylinder —1— is closed at both ends, 3, 4, and through one of said ends (that having the cap 3 provided with a stuffing box, 5) passes the piston rod, 6.

The piston (2) has small openings 8 in its bottom or end, and said piston also carries diaphragms, 9, 10, 11, which also have similar small openings 8 therethrough. The number of diaphragms is varied according to the degree of elasticity which is desired, and form, in the body of the piston, a like number of chambers, 12, 13, 14, wherein the air expands passing from one to the other through the holes 8. It depends upon the kind of vehicle, whether it will be sufficient to have holes provided only in the bottom 7 of the piston, or whether one or a greater number of diaphragms, 9, 10, 11, may also be required in order to obtain the degree of elasticity desired. The number of holes and their diameter may also vary in order to secure the desired intensity in the action of the device; as a rule each hole will be so small as not to permit a too rapid passage of the air, since otherwise too much pneumatic power would be lost in absorbing the effect of a strong shock. Under such circumstances, if the piston 2 is forced to travel in the cylinder 1, there results a compression, in the air chambers (12, 13, 14) inclosed in the piston; that is to say, if, for example, it is assumed that the piston (Fig. 1) travels toward the bottom 4 of the cylinder, the air inclosed in the space 15 is compressed, and tends to escape through the holes 8 provided in the bottom 7 of the piston, such air attaining a certain speed which increases together with the pressure and is in inverse proportion to the number and the total area of the holes in bottom 7. This movement of air tends to produce an increase in the pressure of the chamber 14 immediately adjacent comprised between the bottom 7 and the first diaphragm 11. From this first chamber, on account of the increase of pressure which has taken place, the air escapes through the holes provided in the diaphragm 11 and increases the pressure in the successive chamber 13 comprised between the first and the second diaphragm 10, and through the holes of this second diaphragm, the air passes into another chamber and so on, until it reaches the space 16 before the piston, tending to reëstablish the equilibrium of the pressure which, in consequence of the compression occurred in the space 15, had been diminished by a rarefaction.

The flow of the air through the holes of the successive diaphragms produces an elastic resistance to the backward stroke of the piston more yielding than the resistance which would be afforded by the compression of the air confined in the space —15— if no outlet for same were provided, and such that the piston always runs smoothly and at the same time in proportion to the effect of the shock transmitted upon the piston from the wheel by means of the intermediate links, without the sudden rise of pressure which would produce the compression of the air in a confined space. If the shock is a slight one, the speed of the air through the holes, on account of the small pressure produced, is slow; if, on the contrary, the shock is strong, the pressure rises considerably on account of the greater violence in the displacement of the piston, while the speed of the air through the holes also increases, so that the required smooth and elastic yield of the piston is always secured.

The elastic reactions described will take place either in the chamber 15 or in the chamber 16, according to the direction of movement of the piston.

The cylinder 1 may be applied in such a manner that the movement of the piston always corresponds to the movement of a wheel in jumping over an obstacle, and, for that purpose, the wheel instead of being directly mounted on the axle of the vehicle, may be carried, for instance, on a spindle at the end of a lever or of a system of levers interposed, for example, as indicated in Fig. 2, which illustrates the invention as applied to a bicycle; the hub 17 of the wheel 18 is carried in one arm 19 of an angle lever, and to the other arm, 20, is fastened the spring, 21, attached also to the fork 22, the lower part of which carries also the pivot 23 of the angle lever. The cylinder 1 is interposed between the fork and the lever and the spring 21 is designed only for the purpose of keeping the system balanced in the normal condition in which the piston is inactive.

Fig. 3 shows how the cylinder 1 of the pneumatic shock absorber is carried in a manner similar to that of Fig. 2, but adapted for an automobile and other vehicles, and the same reference numerals indicate corresponding parts. The cylinder, 1, and the spring, 21, are—in this case—placed horizontally, and the pivot, 23, of the angle lever 26, carrying the journal 27 of the wheel, is fastened to the frame of the vehicle.

The arrangement of Fig. 4 shows the wheel carried by a journal 27 integral with a slide 24 which is guided in a conveniently-shaped plate or cylinder 25 connected with the axle of the vehicle. Said slide 24, which carries the wheel, is connected, in its turn, to the ends of one or more rectilinear or angular levers 28, pivoted at 23 and rigidly connected to the axle of the vehicle. To the respective ends of each of said levers are fastened a spring 21 and the slide 24. The springs 21 serve, in this case also, for restoring the equilibrium of the whole, as soon as the obstacle has been overcome by carrying the pistons of the cylinders into their original position of rest so that they are always ready to act in the manner described, in order to absorb smoothly and elastically the shocks produced by the unevenness of the road. In certain cases, a single cylinder may be arranged to operate in connection with two levers 29 and with two pistons, with their rods extending from the covers at both ends of the cylinder, as shown in Fig. 5; the action however, is always the same as that of the cylinder with a single piston above described, with the only difference that instead of two separate chambers one common chamber is formed in the middle.

Having thus described my invention, what I claim is:—

In a pneumatic shock absorber for vehicles of any description; a cylinder, a hollow piston movable therein, a plurality of partitions forming a succession of chambers in the interior of the piston, holes through said partitions and the end walls of the piston allowing the passage of the air from one chamber to the other and establishing a communication between the spaces at the front and rear of the piston through the chambers in the interior of the piston, at least one lever pivoted on a fixed point of the frame of the vehicle, suitable connections between one end of the lever and the axle of the vehicle, an elastic resistance at the other end of the lever in order to return same in the resting position after any displacement, and a piston rod linked to the piston and the lever.

In witness thereof I have set hereunto my hand, this 8th day of January 1910.

GIUSEPPE TARAGLIO.

Witnesses:
  LETTERIO LABOCCETTA,
  ANTONIO LABOCCETTA.